United States Patent [19]

Branigan et al.

[11] Patent Number: 4,698,638

[45] Date of Patent: Oct. 6, 1987

[54] DUAL MODE TARGET SEEKING SYSTEM

[75] Inventors: John T. Branigan, Claremont; Jacques J. Malaise, Mountain View, both of Calif.

[73] Assignee: General Dynamics, Pomona Division, Pomona, Calif.

[21] Appl. No.: 813,745

[22] Filed: Dec. 26, 1985

[51] Int. Cl.4 .................. H01Q 13/10; H01Q 21/28
[52] U.S. Cl. ................................. 343/725; 343/770; 342/53
[58] Field of Search ............. 343/725, 729, 770, 754, 343/846, 753, 909, 911 R; 342/53

[56]  References Cited

U.S. PATENT DOCUMENTS

| | | | |
|---|---|---|---|
| 2,405,992 | 8/1946 | Bruce | 343/910 |
| 2,412,202 | 12/1946 | Bruce | 343/910 |
| 2,423,648 | 7/1947 | Hansell | 343/720 |
| 2,719,230 | 9/1955 | Smoll et al. | 343/911 |
| 2,808,586 | 10/1957 | Ehrlich et al. | 343/838 |
| 2,870,444 | 1/1959 | Broussaud | 343/909 |
| 2,895,127 | 7/1959 | Padgett | 343/7 |
| 2,972,743 | 2/1961 | Svensson et al. | 343/838 |
| 3,016,534 | 1/1962 | D'Agostino et al. | 343/725 |
| 3,114,149 | 12/1963 | Jessen, Jr. | 343/720 |
| 3,146,451 | 8/1964 | Sternberg | 343/753 |
| 3,165,749 | 1/1965 | Cushner | 342/53 |
| 3,242,485 | 3/1966 | Astheimer | 343/6 |
| 3,317,911 | 5/1967 | Stahler et al. | 343/755 |
| 3,320,420 | 5/1967 | Paglee et al. | 342/53 |
| 3,701,158 | 10/1972 | Johnson | 343/725 |
| 3,789,419 | 1/1974 | Schultz | 343/873 |
| 3,911,433 | 10/1975 | Redman | 343/6 |
| 3,990,078 | 11/1976 | Bellee et al. | 343/770 |
| 4,355,313 | 10/1982 | Hubert | 343/725 |
| 4,477,814 | 10/1984 | Brumbaugh et al. | 343/725 |

Primary Examiner—William L. Sikes
Assistant Examiner—Michael C. Wimer
Attorney, Agent, or Firm—Neil F. Martin; Edward B. Johnson

[57] ABSTRACT

A dual mode target seeking system for airborne vehicles which operates under two different frequencies simultaneously includes a radio frequency antenna comprising a slotted plate defining a ground plane with an image plate positioned in front of the ground plane at a distance chosen such that multiple reflected rays are in phase with each other and with waves incident on the image plate. The slotted plate and image plate have aligned central openings through which an electro-optical system for operating under a chosen electro-optical frequency range, for example under infrared frequencies, projects. The electro-optical system includes a detector unit positioned behind the antenna and a focussing system for directing incoming electro-optical radiation into the detector unit. The focussing system includes first and second lenses mounted in the openings in the image plate and slotted plate, respectively. The lenses each transmit radiation in the chosen electro-optical frequency range while at least partially reflecting radio frequency radiation.

17 Claims, 7 Drawing Figures

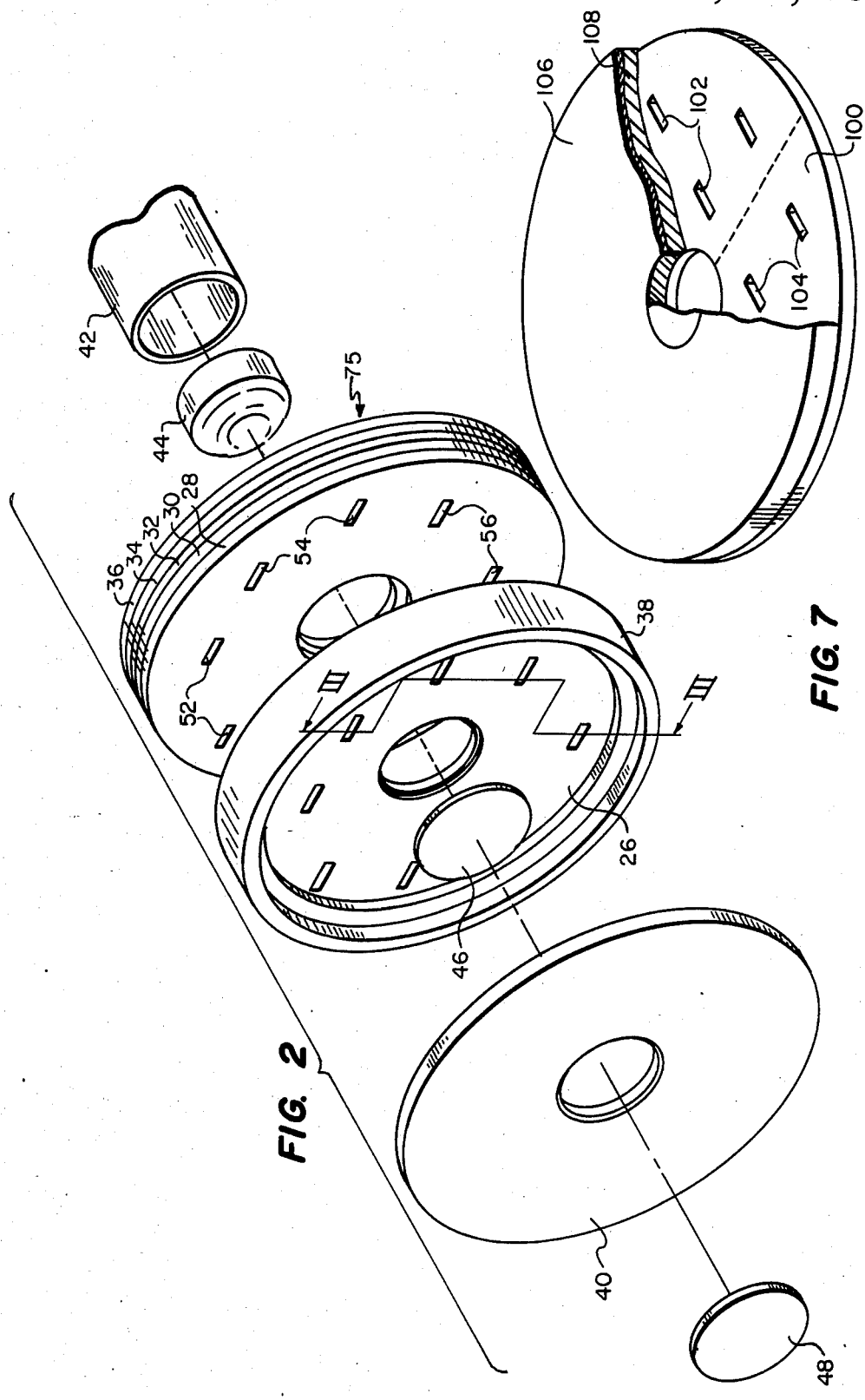

DUAL MODE TARGET SEEKING SYSTEM

BACKGROUND OF THE INVENTION

The present invention relates to target seeking systems for receiving radiation of two different frequencies simultaneously, for example electro-optical and microwave or radio frequencies (RF), and is particularly concerned with dual mode target seeking systems for airborne vehicles such as guided missiles, for example.

Missile target seeking systems receive target generated or target reflected radiation from moving or stationary targets and determine the relative positions of the missile and target from the information received. This information is used to make adjustments to the missile flight path so that it is accurately directed at the target. In the past missile target seeking systems have included both electro-optical radiation detection systems and radio or microwave frequency tracking systems. The electro-optical system is passive and detects radiation generated by the target, for example infrared radiation. The radio frequency system transmits radiation to the target and receives radiation reflected from the target. Since both systems have disadvantages when used alone, it is normally desirable to combine both electro-optical and radio frequency tracking in a missile target seeking system to ensure relatively high accuracy.

Because of the lack of space and gimbal mounting requirements, and weight restrictions in a missile seeker head, both the electro-optical and radio frequency target seeking system are normally commonly mounted to utilize a common aperture. In previous integrated systems of this type conventional flat plate arrays or parabolic reflectors for the radio frequency portion of the system are combined with the infrared system. This integration results in interference between the two scanning systems and significant aperture blockages. This leads to degradation in the radio frequency signal pattern, for example, higher sidelobes, and also to lower radio frequency gain.

Some previous combined electro-optical and radio frequency target seeking systems of the parabolic reflector type are shown, for example, in U.S. Pat. No. 2,972,743 of Svensson et al and U.S. Pat. No. 3,114,149 of Jessen. In both of these systems incoming infra red radiation is reflected from two infra red reflective surfaces into an infrared detection system. Microwave radiation is reflected from a parabolic reflector onto a microwave receiver/transmitter centrally mounted in one of the infrared reflective surfaces. The infra red detector system projects through the other reflective surface. These systems have mounting and space problems, particularly when used in missile seeker heads, and give rise to significant interference and aperture blockages since the microwave receiver and infrared reflector are mounted in the path of incoming rays.

A flat plate array antenna system is shown in U.S. Pat. No. 3,701,158 of Johnson. A radio antenna comprising a plate array of dipole radiating slots for receiving and transmitting directional radiation has an infra red sensing system extending perpendicularly out of it. The central cut out in the antenna array for mounting the infrared system will result in some loss in the radio frequency signal pattern.

SUMMARY OF THE PRESENT INVENTION

According to the present invention, a dual mode target seeking system for airborne vehicles which can receive radiation of two different frequencies simultaneously is provided.

The target seeking system includes a radio frequency antenna having a ground plane and an antenna array extending across the ground plane. The radio frequency antenna has an opening through which an electro-optical processing system for receiving electro-optical radiation projects. The electro-optical processing system focuses incoming electro-optical radiation to a position behind the radio frequency antenna.

The radio frequency antenna is preferably an image plate array antenna, with an image plate spaced in front of the ground plane which acts as a partial reflector to radio waves of the frequency transmitted by the antenna array, the antenna array and image plate having aligned openings extending through them, and the electro-optical system extending through the aligned openings in the antenna array and image plate for focusing incoming electro-optical radiation to a point behind the antenna. The distance between the antenna array and image plate is chosen such that the multiple reflected waves are in phase with each other as well as the incident waves and thus add, to produce a more directive radiation pattern. This distance is chosen to be one half of the wavelength of the radio frequency radiation in the preferred embodiment.

In the preferred embodiment of the invention, the antenna array comprises a conductive plate having an array of radiating slots across its surface. The plate surface defines the ground plane of the antenna. The plate is backed by stripline circuit boards which comprises a comparator and feed network for combining signals received by the slots in a desired fashion to provide directional control signals to a suitable servo control mechanism and for supplying energy to the slots to be radiated in the form of radio waves of the chosen frequency. The stripline circuit boards, slotted plate, and image plate are provided with aligned central openings through which the electro-optical system extends.

The electro-optical system comprises a processing unit for sensing incoming radiation at electro-optical frequencies which is mounted behind the radio frequency antenna, and a series of windows or lenses for focusing or directing radiation in the chosen electro-optical frequency range, for example infrared radiation, into the processing unit. Preferably a first window or lens is mounted in a central opening provided in the image plate, and a second window or lens is mounted in the slotted conductive plate carrying the array of radiating and receiving slots. Each window is arranged to transmit radiation in the chosen electro-optical range while at least partially reflecting radio frequency radiation.

In the preferred embodiment of the invention, the image plate is of a high dielectric material which acts as a partially reflecting sheet, and the first window or lens has a dielectric constant and thickness matched as closely as possible to that of the image plate. The dielectric constant of the image plate and first window or lens are preferably in the range between 10 and 40. Thus, the first electro-optical window or lens causes little or no interruption in the partial reflection of radio waves incident on the image plate, and the image plate and lens surfaces which face towards the array are as closely as possible flush to form a substantially continuous surface for the partial reflection of incident radio waves.

The second window or lens is mounted with its outer face flush with the antenna array ground plane defined by the outer face of the slotted conductive sheet. The outer face of the lens is surface coated with a material which reflects radio waves while being substantially or completely transparent to the chosen electro-optical frequencies, for example infrared. In a preferred embodiment the surface coating is in the form of a fine conductive mesh or grid with the mesh size chosen in accordance with the desired reflecting and transmission wavelengths. The mesh will therefore simulate a continuous ground plane with the slotted plate at radio frequencies, while enabling electro-optical frequency radiation to pass through to the optical processing unit.

BRIEF DESCRIPTION OF THE DRAWINGS

A better understanding of the present invention will be provided by consideration of the following detailed description of a preferred embodiment of the present invention, taken in conjunction with the accompanying drawings, in which like reference numerals refer to like parts and in which:

FIG. 2 is a perspective exploded view of the radio frequency (RF) antenna of FIG. 1;

FIG. 7 is a perspective view with portions cut away showing details of an alternate embodiment of the RF antenna.

DESCRIPTION OF THE PREFERRED EMBODIMENT

Figure 1:
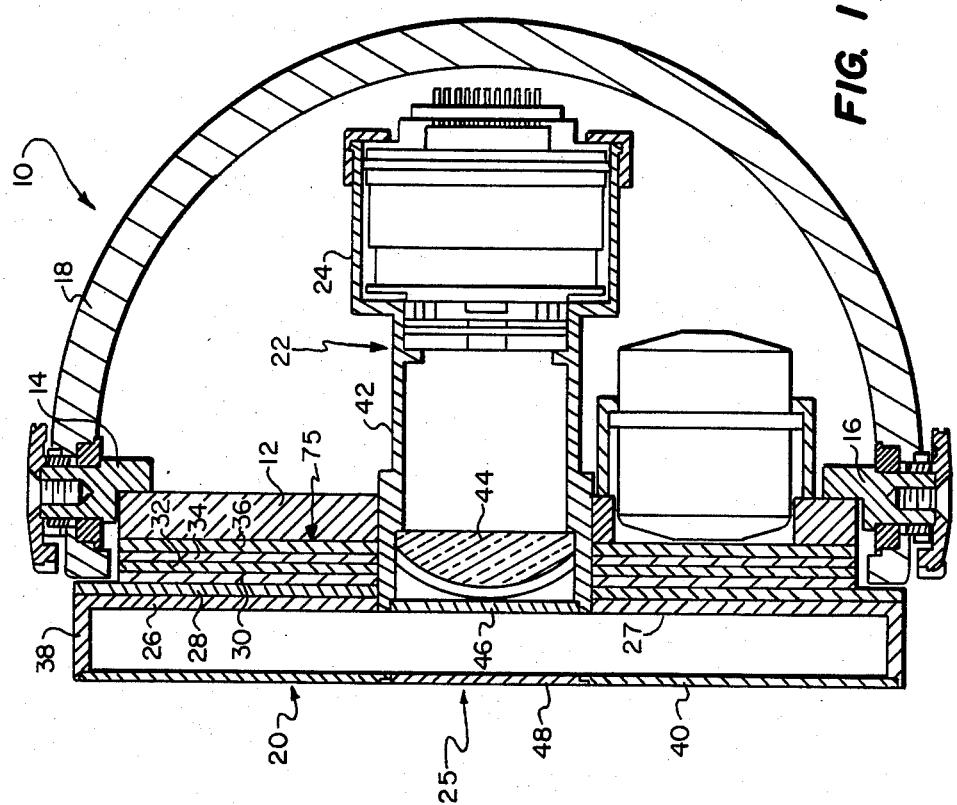
FIG. 1 is a side elevational view partially in section showing a preferred embodiment of the target seeking system of the invention positioned on a gimbal mount.
Figure 3:
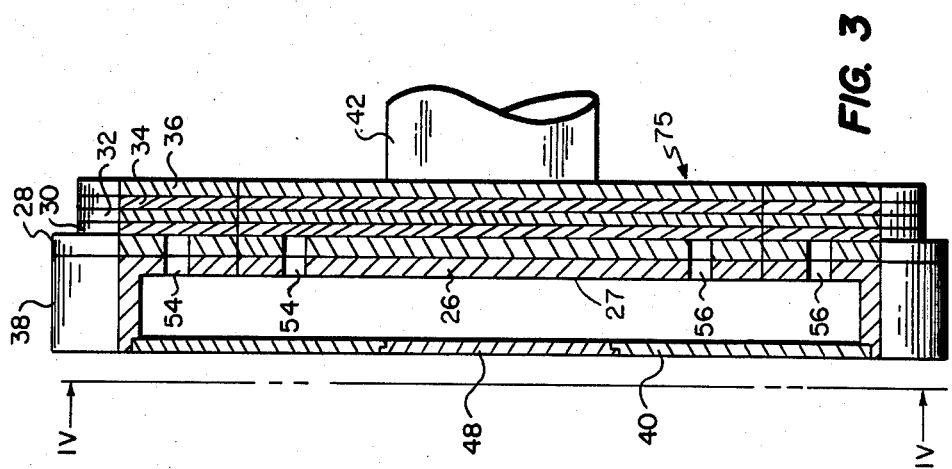
FIG. 3 is a side elevation section view of the antenna taken generally on line III—III of FIG. 2 showing the radiating slots of the RF antenna.

FIGS. 1 to 3 of the drawings show a target seeking system 10 according to a preferred embodiment of the present invention which may be used as part of the tracking control system of a missile or other unmanned airborne vehicle. The target seeking system 10 comprises a radio frequency antenna 20 and an electro-optical processing system 22 for detecting target reflected and target originating radiation in chosen radio frequency and electro-optical frequency ranges, respectively. In the preferred embodiment of the invention described below the chosen electro-optical frequency range is infrared, but other electro-optical frequencies such as ultra-violet or visible light may be used in alternative embodiments.

The target seeking system is used as part of the flight path control system of the missile, for example, and directional signals received from the radio frequency antenna and/or the electro-optical processing system can be used to steer the missile or other vehicle so that it points towards the target.

As shown in FIG. 1, the target seeking system 10 is gimbal mounted by means of a platform 12 pivotally mounted on trunion shafts 14 and 16 to a rolling arc support 18. This enables the system 10 to be pivoted about two mutually orthogonal axes for scanning.

The electro optical processing system includes an infrared detector unit 24 mounted behind the radio frequency antenna 20, and a directing or focussing system, indicated generally by the reference numeral 25, projecting through the radio frequency antenna for directing infrared radiation behind the antenna 20 and into the detector unit 24.

Figure 4:
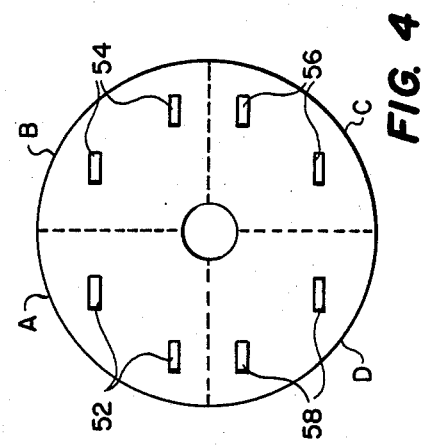
FIG. 4 is a front elevation view taken generally on the line IV—IV of FIG. 3 showing the array plate.

The radio frequency antenna 20 is a slotted plate type and includes a slotted conductive plate 26 defining a ground plane 27 in its outer face and having an array of slots (see FIG. 2) across its outer face comprising an antenna array for transmitting and receiving radio frequency radiation. Conductive plate 26 is of a suitable lightweight material such as aluminum. As shown in FIGS. 3, 4 and 7 the slots are of dipole shape and comprise pairs of slits 52, 54, 56 and 58 arranged in respective quadrants of the conductive plate 26.

The conductive plate is backed by a stripline comparator and feed network system 75 comprising one or more stripline circuit boards 30, 34 sandwiched between stiffener plates 28, 32 and 36 of a suitable lightweight material such as aluminum. The front stiffener plate 28 has slots aligned to match the slots in conductive plate 26. The rear most stiffener plate 36 is mounted against support platform 12. The conductive plate can also act as a stiffener plate precluding the need for stiffener plate 28.

The circuit board 30 is provided with a suitable feed and comparator circuit for supplying energy to the slots 52, 54, 56, 58 to be radiated in the form of microwaves and for combining signals received from the slots as described in more detail below to provide suitable elevational and azimuthal directional control signals. Such circuit board techniques are well known in the antenna array field and will not be described in great detail. The extra circuit board 34 may also incorporate part of the feed and comparator network, and may contain additional control circuitry for the missile.

An image plate 40 of a material partially transparent and partially reflective to radio waves is mounted in front of the antenna array ground plane 27 by means of a support or spacer ring 38 extending forwardly from the peripheral edge of conductive plate 26. Spacer ring 38 may be formed integrally with the plate 26 or may comprise a separate ring in which both the conductive plate 26 and image plate 40 are mounted.

Figure 6:
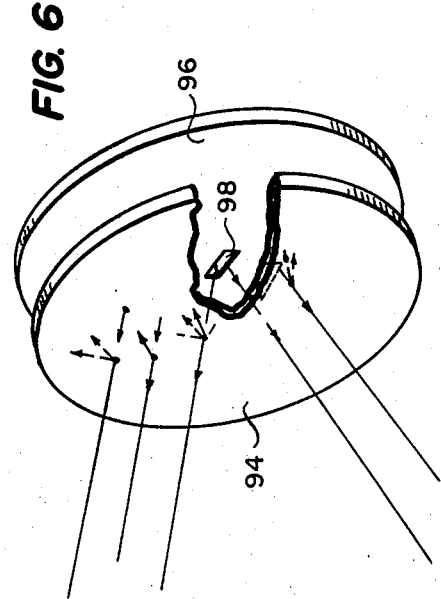
FIG. 6 is a schematic perspective view illustrating the reflection principles of the RF antenna construction.

The spacing between the slotted front surface or ground plane 27 of the conductive plate 26 and the opposed face of the image plate 40 is chosen to be equal to w/2 or some whole multiple thereof, where w is the wavelength of the transmitted radio waves. Thus the radio frequency part of the system is in the form of an image plate array, with multiple reflected waves from the image plate and conductive plate being in phase with each other as well as the incident waves as indicated in FIG. 6, so that they add. The image plate has the effect of making the individual antenna array elements or slots more directive, leading to radiation patterns with lower sidelobes.

The image plate is of a material having a relatively high dielectric constant suitably greater than 10. One suitable material for the image plate is barium tetratitanate, type D-38 which has low loss and high dielectric constant properties. The dielectric constant of this material is 37.0 plus or minus 5% at 6 GHz. This material is opaque to electro-optical frequency radiation while acting as a partially reflecting sheet to radio frequency radiation.

The components of the radio frequency antenna, i.e. the image plate, slotted plate and stripline boards, and support plates are provided with aligned central openings as best seen in FIG. 2.

The electro optical focussing system 25 extends through the aligned openings for directing incoming radiation at the chosen electro-optical frequency range, for example infrared, into the detector unit 24.

The detector unit 24 comprises an arrangement of sensors or detectors for the electro-optical radiation, for example infra-red sensors, arranged in a known manner to provide suitable directional control signals in response to incoming radiation. The detector unit is mounted on the inner end of a cylinder or barrel 42 which projects forwardly through the openings in the support platform 12, stripline boards and support plates, and the conductive plate, as shown in FIG. 1.

The focusing system 25 comprises a first lens or window 48 which is centrally mounted in the image plate 40 and a second lens or window 46 which is centrally mounted in the slotted plate 26. The second lens 46 is mounted so as to be flush with the front face or ground plane of the slotted plate 26. A further lens 44 is mounted in the cylinder or barrel 42 behind the second lens 46.

The first lens or window 48 is of a material which will transmit electro-optical radiation but is at least partially reflective at radio frequencies. The dielectric constant and thickness of lens 48 is closely matched to that of the image plate 40. Thus, the lens is chosen to have dielectric properties which are as close as possible to those of the image plate material.

One suitable material for the lens or window 48, where the image plate is of barium tetratitanate, is lithium tantalate. This material has very good electro-optical properties while being at least partially reflective of radio frequencies. It is desirable but not essential that the image plate 40 and lens 48 have dielectric constants in the range from 10 to 40, and suitable materials in this range other than barium tetratitanate and lithium tantalate may be used.

Since the first window or lens 48 has its faces substantially flush with the opposite faces of the image plate, and has almost the same dielectric properties as the image plate, it will not degrade the performance of the radio frequency antenna array portion of the system to any significant extent. The image plate material is opaque to incoming radiation at electro-optical frequencies, and thus such radiation will be directed through the window 48.

The second window or lens 46, which may be a BK-7 filter, is of any suitable material for transmitting electro-optical frequency radiation, for example infrared radiation, and is mounted with its outer face substantially flush with the front surface or ground plane of the slotted plate 26. The outer face of the lens is surface coated with a thin film of optically transparent but highly conductive material which simulates a continuous ground plane at radio frequencies while transmitting radiation in the chosen electro-optical range, for example infrared, through to the detector unit 24 via electro-optical lens 44. In the preferred embodiment of the invention the coating is a fine conductive mesh or grid which may be vacuum deposited on the lens. The lens may be of ZnS, ZnSe, ZnCre or any of the infrared transmitting glasses. The grid size is designed for optimal transmittance at the chosen electro-optical frequency range, for example at infrared frequencies between 3 and 5 microns. The percent transmittance achieved is an inverse function of the surface resistivity. In one example, an infrared transmitting coating of 25 ohms/square resistivity on a sapphire substrate of 0.040 inches was designed for optimum transmittance at 3.75 microns. An anti-reflection coating may be provided on the surface opposite the conductive coating.

Since the conductive mesh simulates a continuous ground plane at radio frequencies, lens 46 will cause little or no interference or degradation in the radio frequency part of the system.

The dual mode target seeking system of this invention therefore combines electro-optical and radio frequency components with negligible degradation to either of the individual systems performance. The system can be arranged for mounting in a relatively small space such as in a missile seeker head as illustrated in FIG. 1.

The target seeking system incorporating the image plate array has been estimated to increase the overall gain by 5 dB over a parabolic reflector type of combined radio and electro-optical system. The image array may be designed with a target aperture of the order of 4.5 inches as compared with 4.2 inches for a parabolic reflector system. The electro optical system lenses in a typical arrangement can have diameters of the order of about 1.0 to 1.2 inches.

Figure 5:
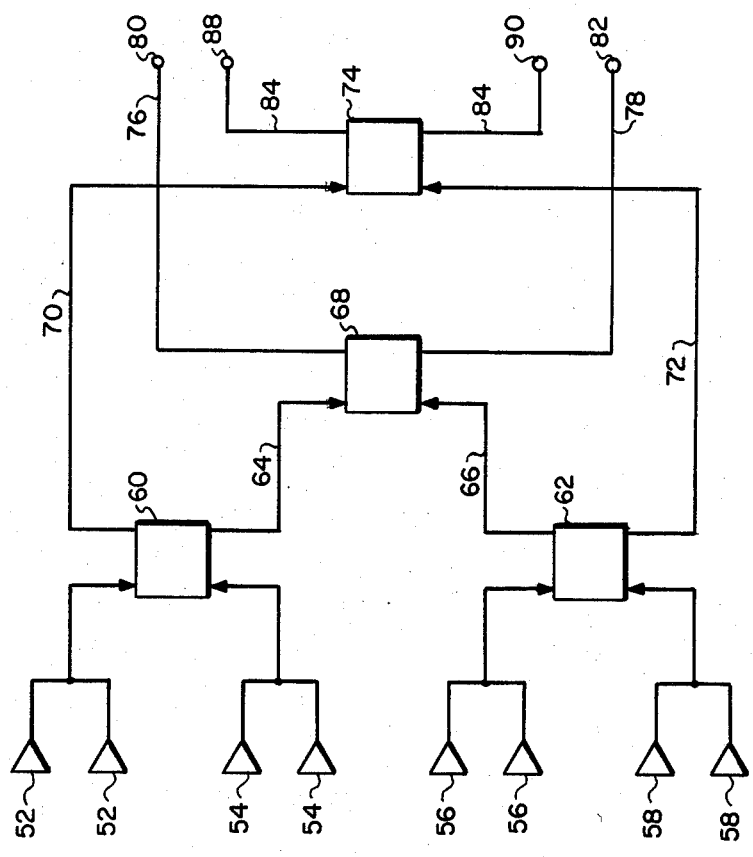
FIG. 5 is a schematic diagram of the RF antenna comparator and feed network unit.

The operation of the radio frequency (RF) antenna will now be described in more detail with reference to FIGS. 4 and 5.

As shown in FIG. 4, the RF antenna conductive plate 26 is divided into quadrants A, B, C and D with each quadrant having two slots or radiating elements 52 through 58, respectively. The slots are arranged in quadrant arrangement as shown in FIG. 4 and connected in a comparator circuit as shown in FIG. 5. The comparator circuit is provided on one or more of the stripline circuit boards. Pairs of quadrants A and B (slots 52 and 54) are connected through one hundred and eighty degree hybrid ring 60 and quadrants C and D (slots 56 and 58) are connected through hybrid ring 62. These in turn are connected by waveguides or conductors 64 and 66 to hybrid ring 68 and by conductors 70 and 72 to hybrid ring 74. The hybrid ring 68 is connected by conductors 76 and 78 to termination ports 80 and 82. The hybrid ring 74 is connected through conductors 84 and 86 to ports 88 and 90. With this arrangement, for example, the sum of quadrants A and B are transmitted by conductor 64 to hybrid ring 68 with the sum of quadrants C and D transmitted by way of conductor 66 to ring 68. The quadrants are summed to port 80. The difference of ports A and B is transmitted by conductor 70 to ring 74 with the differences between quadrants C and D transmitted by way of 72 to ring 74. Change in Azimuth (AZ) (A+C)−(B+D) is communicated to port 88. Port 90 is the terminated port and change in elevation ($\Delta$EL) ((A+B)=(C+D)) is communicated to port 82.

In operation, the RF antenna may operate solely as a receiving antenna or may operate both as a transmitting and receiving antenna. When operating solely as a receiving antenna, a target is illuminated by a source radar with the reflected energy being received by the antenna through the image plate and ground plane into the ports and through the comparator circuit to the necessary control or other data processing unit. Similarly, infrared energy emitted from a target is received by the IR processing system and transmitted through the arrangement of lenses to the IR detector unit for processing and transmitting to the control system for processing and utilization for steering the missile toward the target.

Referring to FIG. 6, schematically illustrated are a ground plane 96 and the image plate 94 showing the effect of the partially reflecting plate 94, which is equivalent to image plate 40, on radiated waves from a slot source 98. A radiating element 98 transmits waves outward as shown by the arrows which hit the partially reflecting plate 94 and are partially reflected back to the ground plane 96 and back again to the reflecting plate. These multiple reflected waves add together and add to the initially incident waves so as to convert wide beam radiation from a single slot element to a narrow beam. Incoming radiation will be similarly converted to a narrow beam.

The dual-mode target seeking system of this invention is relatively compact, introduces little or no degradation or interference between the radio-frequency and electro-optical frequency parts of the system, and can be easily incorporated into existing navigational or tracking systems.

Although there are two slots per quadrant in the illustrated antenna array, a greater number of radiating slot elements may be provided. FIG. 7 shows another possible modification to the system, in which a dielectric spacer plate 108 of low dielectric constant material, preferably less than 2.0, separates a conductive plate 100 having a plurality of feed or radiating slots 102, 104 from an image plate 106. The rest of the system of FIG. 7 will otherwise be the same as that shown in FIGS. 1 to 4 and is therefore not shown.

Although a preferred embodiment of the invention has been described above by way of example, it will be understood by those skilled in the field that modifications may be made to the disclosed embodiments which are within the scope of the invention as defined by the appended claims.

We claim:

1. A dual mode target seeking system for an airborne vehicle, comprising:
    a radio frequency antenna structure including an antenna plate having an antenna array across its surface for receiving and transmitting radio frequency radiation, the plate having an outer surface defining a ground plane, means for transmitting signals to said antenna array and means for receiving signals incident on said array; and
    an electro-optical processing system extending through said radio frequency antenna structure and including directing means for directing incoming electro-optical radiation to a point behind said radio frequency antenna; the directing means including a window mounted in said antenna plate with its outermost face substantially flush with said ground plane to form a substantially continuous surface with said antenna plate, said window comprising means for transmitting radiation in said predetermined electro-optical frequency range and for at least partially reflecting radio frequency radiation.

2. The system of claim 1, wherein said radio frequency antenna structure has aligned central openings extending through it, and said electro optical processing system includes detector means located behind said radio frequency antenna for detecting radiation in a predetermined electro-optical frequency range, said directing means comprising means extending through said aligned openings in said radio frequency antenna for directing radiation in said predetermined electro-optical range onto said detector means.

3. The system according to claim 1, wherein
    said radio frequency antenna includes an image plate spaced in front of said ground plane for partially reflecting incident radio waves back towards said ground plane, the spacing between said ground plane and said image plate being such that waves reflected from said image plate and said ground plane and said incident waves are in phase.

4. The system of claim 3, wherein the spacing between said ground plane and image plate is equal to one-half wavelength of said incident radio frequency waves.

5. The system according to claim 3, wherein said directing means further includes a second window mounted in said image plate, said second window comprising means for transmitting radiation in said predetermined electro-optical frequency range and for at least partially reflecting radio frequency radiation.

6. The system according to claim 5, wherein said radio frequency antenna plate comprises a slotted plate having an outer face defining said ground plane and an array of slots across said outer face comprising said antenna array, said slotted plate and image plate having aligned central openings and said first and second windows being mounted in said openings in said slotted plate and image plate, respectively.

7. The system of claim 6, wherein said image plate is of a material having a relatively high dielectric constant and said second window is of a material having similar dielectric properties.

8. The system of claim 7, wherein said image plate and second window are of substantially equal thickness.

9. The system of claim 7, wherein the image plate and second window are of materials having dielectric constants greater than 10.

10. The system of claim 9, wherein the dielectric constants are in the range from 10 to 40.

11. The system of claim 10, wherein the predetermined electro-optical frequency range is the infrared range.

12. The system of claim 11, wherein the image plate is of barium tetratitanate and the second window is of lithium tantalate.

13. The system of claim 1, wherein said window is of a material substantially transparent to radiation in said predetermined electro-optical range, and has a coating covering its outer face which is at least partially reflective to radio frequency radiation and which transmits radiation in said predetermined electro-optical range, said coating comprising means for forming a continous ground plane to radio frequency radiation with said ground plane of said antenna means.

14. The system of claim 13, wherein said coating comprises a conducting mesh layer on said outer face of said window designed to transmit radiation in said predetermined electro-optical frequency range and to reflect radio frequency radiation.

15. The system of claim 2, wherein said directing means comprises an assembly of lenses for focusing electro-optical radiation towards said detector means.

16. The system of claim 15 wherein said radio frequency antenna further includes stripline feed and comparator network means backing said slotted plate for supplying energy to said slots for radiating radio frequency energy from said slots, and for combining signals received from said slots to provide directional information, said stripline feed and comparator network means having central openings aligned with said openings in said slotted plate and image plate, said directing means further including lens means behind said window projecting through said openings in said stripline feed and comparator network means for focussing electro-optical radiation onto said detector means.

17. A dual mode target seeking system for an airborne vehicle, comprising:

a radio frequency antenna structure including a slotted plate having an array of slots across its outer face defining an antenna array, the plate having a central opening, means for supplying energy to said slots for radiating radio frequency radiation from said slots, means for receiving incoming signals from said slots, and an image plate spaced in front of said slotted plate for partially reflecting incident radio waves back towards said slotted plate, the spacing between said outer face of said slotted plate and said image plate being such that waves reflected from said image plate and said slotted plate and said incident waves are in phase, the image plate having a central opening aligned with the central opening in said slotted plate; and an electro-optical processing system extending through said radio frequency antenna structure and including directing means for directing incoming electro-optical radiation to a point behind said antenna structure, the directing means including a first window mounted in the central opening in said slotted plate and having an outer face substantially flush with the outer face of said slotted plate to define a substantially continuous ground plane, and a second window mounted in the central opening in said image plate, each window comprising means for transmitting radiation in said predetermined electro-optical frequency range and for at least partially reflecting radio frequency radiation.

* * * * *